(12) United States Patent  
Crippa et al.

(10) Patent No.: US 8,376,101 B2  
(45) Date of Patent: Feb. 19, 2013

(54) PISTON ROLL BACK DEVICE

(75) Inventors: Cristian Crippa, Bergam (IT); Paolo Cesani, Bergamo (IT); Luca Lenzi, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 13/132,337

(22) PCT Filed: Dec. 2, 2008

(86) PCT No.: PCT/IT2008/000738  
§ 371 (c)(1),  
(2), (4) Date: Jun. 2, 2011

(87) PCT Pub. No.: WO2010/064265  
PCT Pub. Date: Jun. 10, 2010

(65) Prior Publication Data  
US 2011/0233008 A1    Sep. 29, 2011

(51) Int. Cl.  
*F16D 55/22* (2006.01)
(52) U.S. Cl. .............. 188/370; 188/72.4; 188/72.3
(58) Field of Classification Search ............ 188/72.3, 188/72.4, 370; 277/553  
See application file for complete search history.

(56) References Cited

U.S. PATENT DOCUMENTS

| | | | | |
|---|---|---|---|---|
| 3,582,093 A | * | 6/1971 | Lucien | 277/434 |
| 4,352,498 A | * | 10/1982 | Burke et al. | 277/311 |
| 4,858,516 A | | 8/1989 | Klein | |
| 5,826,681 A | * | 10/1998 | Kubo et al. | 188/71.8 |
| 7,191,875 B2 | * | 3/2007 | Kurimoto et al. | 188/72.4 |

FOREIGN PATENT DOCUMENTS

| | | |
|---|---|---|
| JP | 06249275 | 9/1994 |
| JP | 09060666 | 3/1997 |
| JP | 10292834 | 11/1998 |

* cited by examiner

*Primary Examiner* — Bradley King  
(74) *Attorney, Agent, or Firm* — Shoemaker and Mattare

(57) ABSTRACT

A brake caliper comprising a piston seat (10) wherein a piston (2) slides with its side surface (11) in contact with a radial surface (13) of an elastic member (12). The member further comprising two axial surfaces (15,16) adapted to be affected by a pressurized fluid and being arranged at the piston coming out side facing the pads respectively. The latter surface facing with a portion (17) thereof, a first chamber (18) arranged in the proximity of the piston side surfaces, with another portion (24) thereof, an abutment surface (19) adapted to support said elastic member when it is urged by the pressurized fluid, said abutment surface being radially retracted so as to be farther from the piston side surface than said first chamber and with a further portion (25) thereof, at least one second chamber (20) arranged radially farther from said piston side surface than said abutment surface.

8 Claims, 9 Drawing Sheets

STATE OF THE ART

PISTON ROLL BACK DEVICE

FIELD OF THE INVENTION

The present invention relates to a piston roll back retracting device adapted to be used in brake calipers of the type comprising a body located astride a brake disc, in which said disc comprises a rotational axis and opposite friction surfaces. Pads are received in said caliper body so as to be capable of sliding in the axial direction relative to the disc, in order to act on the opposite friction surfaces, respectively. Said caliper body further comprises at least one seat adapted to sealingly receive a piston, which is in turn adapted to affect at least one of said pads against the disc friction surfaces, when said piston is urged towards said pads by a brake fluid.

Particularly, the piston retracting device allows to partially cause the piston to move the caliper body to the caliper body seat after the brake fluid has stopped urging the piston, thus allowing the pads to move away from the disc friction surfaces, and preventing them from exerting a non-controlled residual braking action, or a residual braking torque, on the disc, also when a pressure is not applied in the brake system following a braking command of the vehicle by the driver.

BACKGROUND OF THE INVENTION

From JP 64-21826 U, JP 09-060666 A2, and JP10292834, the use of a gasket acting on the piston as a retracting member thereof is known.

This gasket is received in a cylinder surface seat and acts by pressing on the piston so as to be able to strain itself in the piston moving direction, while remaining with one surface in contact with the piston while this moves by being urged by the brake fluid pressure. As the brake fluid stops urging the piston, the gasket elastically and axially strained by the piston returns to the original shape thereof, thus dragging the piston into the cylinder.

In the case where the pad affected by the piston wears out, during the braking action, beyond the gasket strain limit, the piston begins to slide relative to the strained gasket, thus compensating the pad wear amount. Once the braking action is completed, the piston is returned by the gasket only by the amount that is proportional to the strain thereof.

These known piston retracting devices, even if they are satisfactory under many points of view, have an inherent functioning variability related to the caliper body strain when it is subjected to high braking pressures exerted on the disc opposite friction surfaces. In fact, the caliper body, which is arranged astride the disc, with portions thereof facing opposite friction surfaces of the same disc, reacts to the pressure action exerted by the piston(s) by moving away from the disc, initially in an elastic manner, and then, in the case of an elastic strain, it comes back to the position thereof as the braking action stops. This movement away and towards the disc of the caliper body occurs independently from the piston relative movement relative to the seat thereof of the caliper body.

Further, this movement results, as the braking action which cause the caliper body portions to approach the disc friction surfaces stops, in an approach of the piston from the friction surfaces which is not caused by the relative movement between the piston and the seat thereof, however changing the piston relative position relative to the disc. Therefore, this piston position is determined not only by the limited elastic return of the gasket, but in some cases also by the recovery of the caliper elastic strain which, by returning the piston to the proximity of the disc, exerts a thrust of the piston on the pads and the creation of a residual braking torque also when the driver's intentional action stops.

BRIEF SUMMARY OF THE INVENTION

The object of the present invention is to propose a piston retracting device capable of overcoming the drawbacks of the prior art and allowing the piston to move away of from the disc also in the case of an elastic strain of the caliper body.

This object is achieved by a piston retracting device for brake caliper as described in claim 1, as well as by an operative method as described in claim 11.

In accordance with a general embodiment, in a brake caliper comprising a caliper body located astride a brake disc having a rotational axis and opposite friction surfaces, pads received in said caliper body so as to be capable of sliding in the axial direction relative to the brake disc in order to act on said opposite friction surfaces, respectively, and in addition at least one piston seat adapted to receive a piston provided with a side surface adapted to slide in said piston seat, in which said piston is adapted to affect, under the urging action of a brake fluid, at least one of said pads against said brake disc friction surfaces, when said piston is urged towards said pad, a piston retracting device is provided, which comprises elastic means arranged between said piston and said caliper body, so that, upon the withdrawing movement of the piston from the caliper body seat, said elastic means accumulate or store elastic energy both as a function of the piston movement relative to the seat thereof of the caliper body, up to a preset maximum threshold, and as a function of the amount of the piston urging action against said disc friction surfaces.

Preferably, said elastic energy is returned to the piston as the braking action stops, thus causing it to retract into the seat thereof, both by a predefined stroke given by the energy accumulated by the elastic means due to the relative piston movement relative to the seat thereof of the caliper body, up to a maximum retraction stroke, and by a further stroke which is a function of the braking action amount when a predefined minimum threshold for this action has been exceeded.

For example, this action is assessed via the pressure of a brake fluid acting on said piston in order to exert the braking action against the disc friction surfaces, in which said threshold is established in a predefined minimum pressure threshold beyond which, when the braking action stops, the piston is further retracted of a further stroke.

Advantageously, such further elastic energy acting on the piston in order to cause a further return stroke of the piston to the seat thereof is defined so as to compensate the caliper body elastic strain caused by the braking action, reducing or eliminating the effect of this strain on the piston position relative to the disc during the braking action release step.

Advantageously, this piston further return stroke only shows when a predefined minimum stress amount of the caliper body has been exceeded, which amount has caused a sensible elastic strain of the caliper, returning the piston by the further stroke into the seat thereof only when the piston has, in fact, come out by a further stroke towards the disc, which further stroke is required in order to compensate also the strain of the caliper moving away from the disc which is caused by the high braking stress.

BRIEF DESCRIPTION OF SEVERAL VIEWS OF THE DRAWINGS

Further characteristics and the advantages of the device according to the invention will be understood from the description set forth below of preferred exemplary embodiments, given by way of non-limiting examples, with reference to the annexed Figures, in which.

DETAILED DESCRIPTION OF THE INVENTION

Hereinafter, reference will be made to an "axial direction" to mean a direction coincident or parallel to the brake disc rotational axis; to "direction of the hub" to mean the side or the direction of a direction facing the hub or the inner part of a vehicle; to "direction of the wheel" to mean the side or direction of a direction facing a vehicle wheel; to "radial direction" to mean a direction coincident or parallel to a brake disc radial direction; to "withdrawal" or "advancing" or "coming out" to mean the direction of the direction of the path of the piston exiting the seat thereof provided in the caliper body; to "retraction" or "return", or "return" to mean the way of the direction of the piston path entering the seat thereof provided in the caliper body; to "elastic member" to mean the member acting by pressing or forcible contact on a surface, particularly, but not necessarily, to a member so as to prevent a material, for example, a brake fluid, from passing from the one side of such member to the other, for example, a member made of synthetic material acting with a planar surface thereof on a piston sealing surface to isolate the pressurized brake fluid holding chamber from the exterior.

Figure 1:
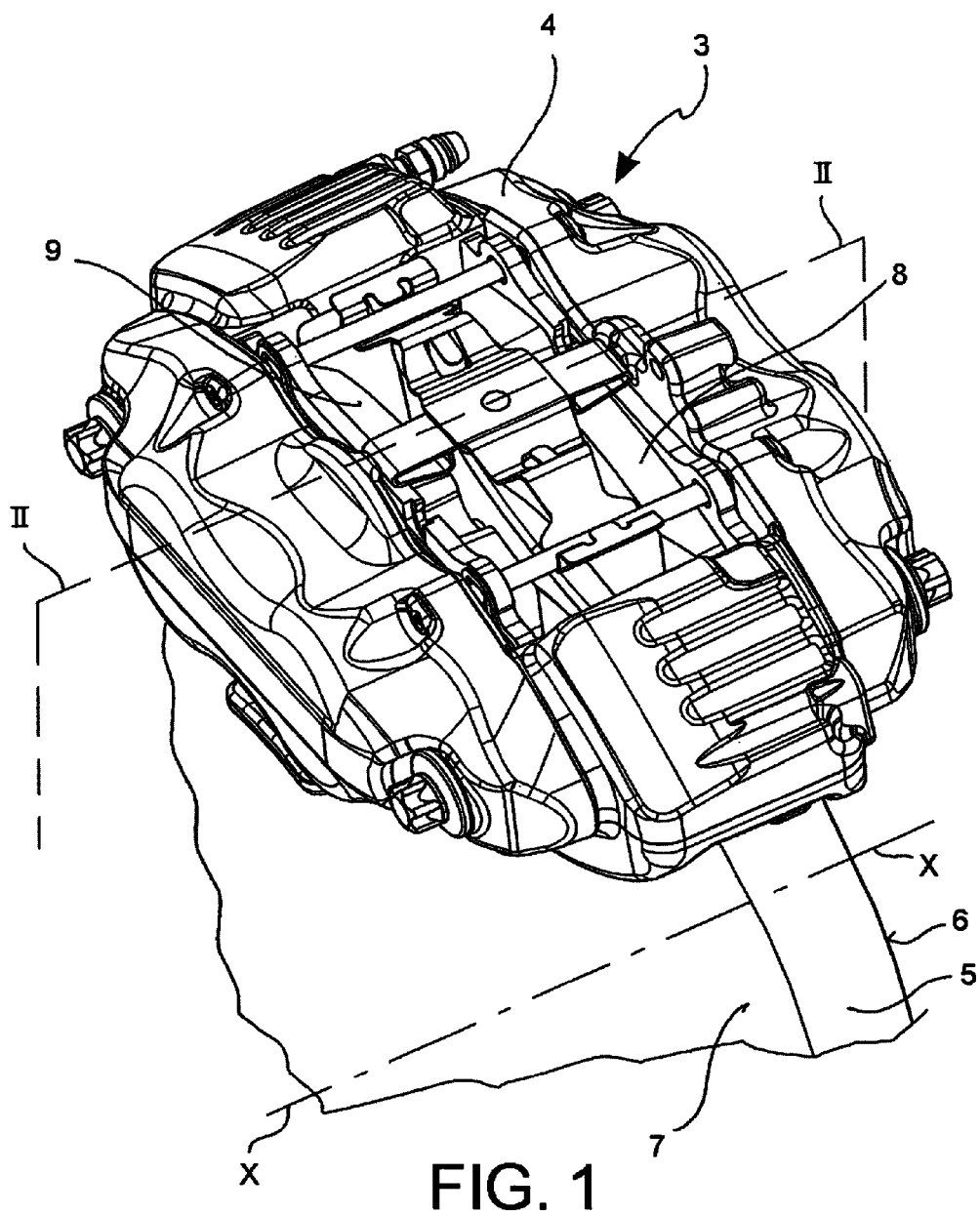
FIG. 1 shows a partially sectional axonometric view of a caliper for disc brake arranged astride a brake disc.

In accordance with an embodiment, a brake caliper 3 comprises a caliper body 4 located astride a brake disc 5 (FIG. 1). Said disc has a rotational axis X-X and opposite friction surfaces 6, 7, upon which braking pads 8, 9 act. Said pads 8, 9) are received in said caliper body 4 so as to be capable of sliding in the axial direction relative to the brake disc (parallel direction to the axis X-X) in order to act on said opposite friction surfaces 6, 7, respectively. Said piston is provided with dust covers 200 which are secured to a seat provided in the piston side surface 11 and at the piston 10 seat mouth 202 provided in the caliper body.

Figure 2:
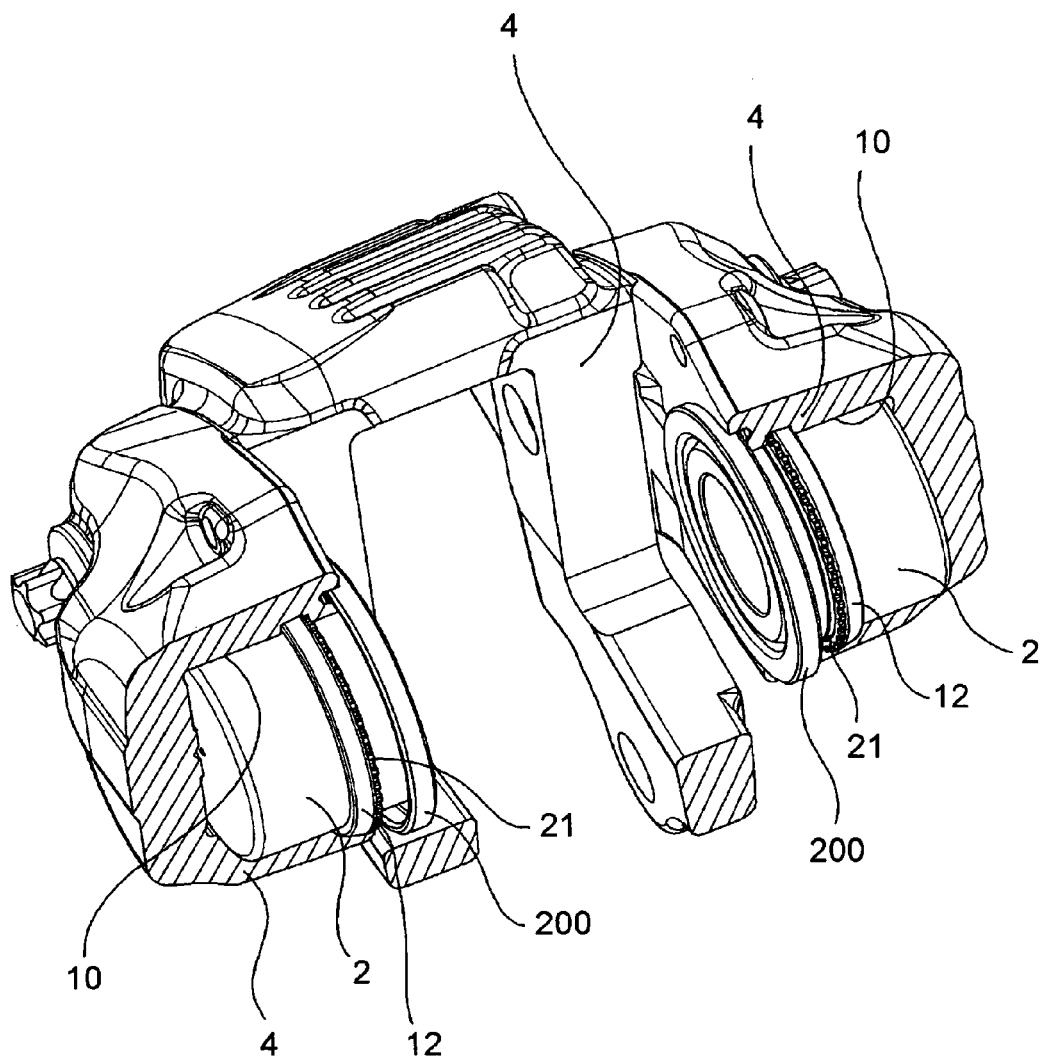
FIG. 2 shows an axonometric view of the section according to the line II-II of the caliper in FIG. 1 without pads and brake disc, highlighting the pad urging pistons, the retraction devices and the dust covers.
Figure 3:
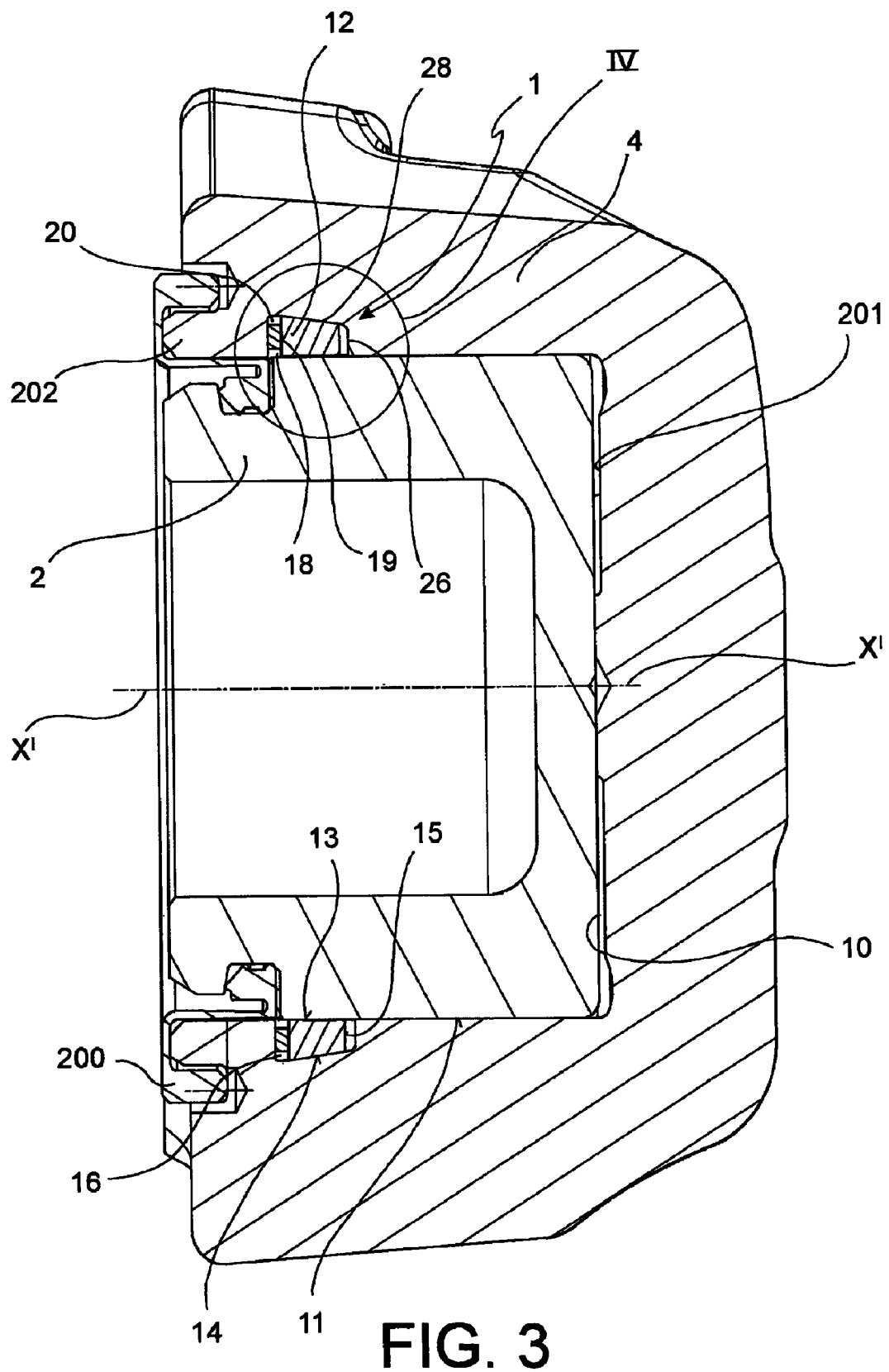
FIG. 3 shows in cross-section a detail of the caliper in FIG. 1 related to a piston received in the seat thereof of the caliper.
Figure 4:
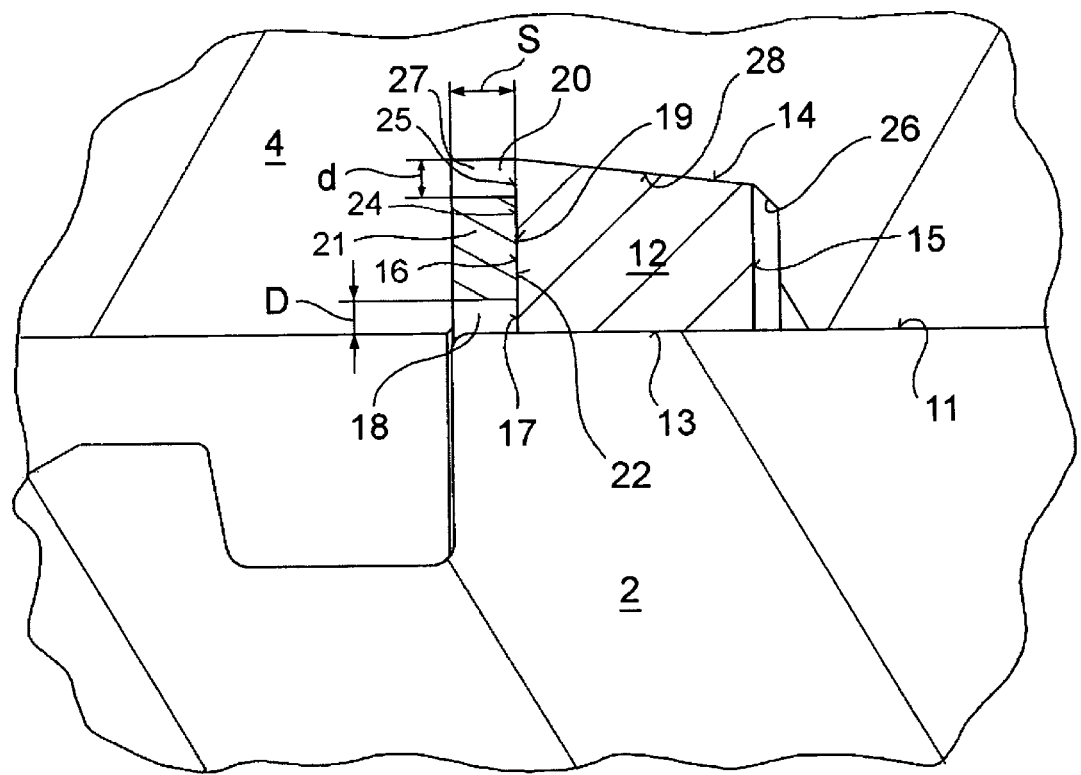
FIG. 4 shows a sectional view of the detail IV in FIG. 3 without the dust cover.

Said caliper body 4 further comprises at least one piston seat 10 adapted to receive the piston 2 (FIGS. 2 and 3). Said piston comprises a side surface 11 adapted to slide in said piston seat 10 so as the piston is capable of being urged by a brake fluid exiting said seat in order to affect at least one of said pads against said brake disc friction surfaces.

A chamber is provided between said seat 10 and said piston 2, which is adapted to receive brake fluid supplied through a brake fluid inlet 201, which puts said chamber into fluid communication, via brake fluid ducts, to a system for the distribution of fluid and the control of the pressure thereof, which pressure is exerted, for example, as the driver of a vehicle on which the braking system comprising the caliper is mounted commands a braking action, or upon the commanding of a gearcase to manage a driving action of the vehicle, for example, in order to rectify the vehicle dynamic behaviour.

In accordance with an embodiment, said device comprises at least one elastic member 12 arranged with a first radial surface 13 thereof in forcible contact against said piston side surface 11 and with a second radial surface 14 thereof in forcible contact against the caliper body.

Advantageously, said elastic member is also a sealing member which is in sealingly contact against the piston side surface 11 and the bottom surface 28 of a groove or annular seat 26 which is provided in the caliper body facing the piston 2 seat 10 and adapted to receive said elastic member 12.

In accordance with an embodiment, said elastic member 12 comprises a third axial surface 15 at the pressurized fluid side, facing away from said pads and adapted to be affected by the brake fluid.

In accordance with an embodiment, said elastic member 12 comprises a fourth axial surface 16 at the piston coming out side, facing the pads.

Advantageously, said elastic member 12 with the fourth surface 16 thereof faces, with a portion 17 thereof, a first chamber 18 arranged in the proximity of the piston side surface and opening towards said piston side surface.

With further advantage, and in accordance with an embodiment, said elastic member with the fourth surface 16 thereof is facing, with a further portion 24 thereof, an abutment surface 19, which is arranged axially retracted relative to said first chamber 18 and relative to the mouth from which the piston comes out from the seat thereof. In accordance with an embodiment, said abutment surface defines, with an edge thereof, the mouth of the first chamber 18, from which the resting elastic member faces said first chamber 18. Said abutment surface is adapted to support said elastic member 12 when it urged by the pressurized fluid. In accordance with an embodiment, said abutment surface 19 is radially retracted so as to be farther from the piston side surface than said first chamber, and so as to leave an opening, from which said elastic member can face said first chamber 18.

In accordance with an embodiment, said elastic member 12 with the fourth surface 16 thereof faces, with a still further portion 25 thereof, at least one second chamber 20 arranged radially farther from said piston side surface than said abutment surface 19.

Advantageously, said abutment surface 19 is axially retracted relative to said second chamber 20 and relative to the mouth from which the piston comes out from the seat thereof. In accordance with an embodiment, said abutment surface 19 defines, with an edge thereof, the second chamber 20 mouth, from which the resting elastic member 12 faces said second chamber 20. Said abutment surface 19 is adapted to support said elastic member 12 when it is urged by the pressurized fluid. In accordance with an embodiment, said abutment surface 19 leaves a space or an interspace with the caliper body, which defines an opening, from which said elastic member faces said second chamber 20. In accordance with an embodiment, said abutment surface 19 is spaced apart from the caliper body by bumps 27, which laterally define said second chamber 20.

Said second chamber 20 has predefined radial d and axial S dimensions.

In accordance with an embodiment, said device comprises a ring 21 housed in an annular seat 26 which is provided in the caliper body facing the piston side surface, and into which the elastic member 12 is also received. Said ring is axially sandwiched between said at least one elastic member 12 and the caliper 4 body at the side opposite the brake fluid relative to the elastic member.

In accordance with an embodiment, said ring 21 has an inner radial dimension R adapted to leave a predefined clearance D between said ring 21 and said piston side surface 11, so as to create said first chamber 18 by abutting against the side wall of the annular seat 26 provided in the caliper body.

In accordance with an embodiment, said ring comprises a side surface 22 facing said at least one elastic member, and adapted to create said abutment surface 19.

In accordance with an embodiment, said ring 21 comprises, in the farthest portion thereof from the piston side surface 11, at least one axially-opened radial recess 23 at least at the side facing said at least one elastic member 12 so as to create said at least one second chamber 20.

Figure 11:
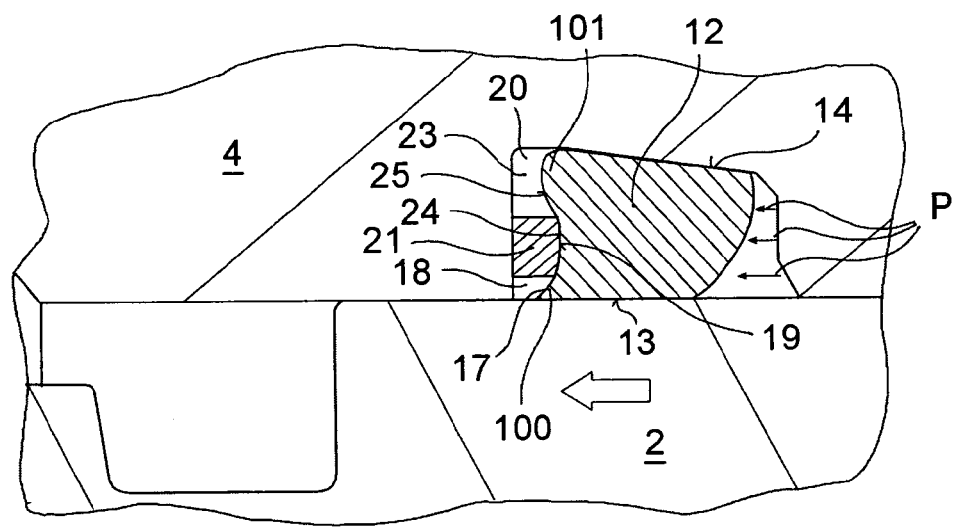
FIG. 11 illustrates a section of a detail of the piston retracting device when the piston moves exiting from the seat thereof of the caliper body and when is also subjected to a braking action of a predefined high amount.
Figure 12:
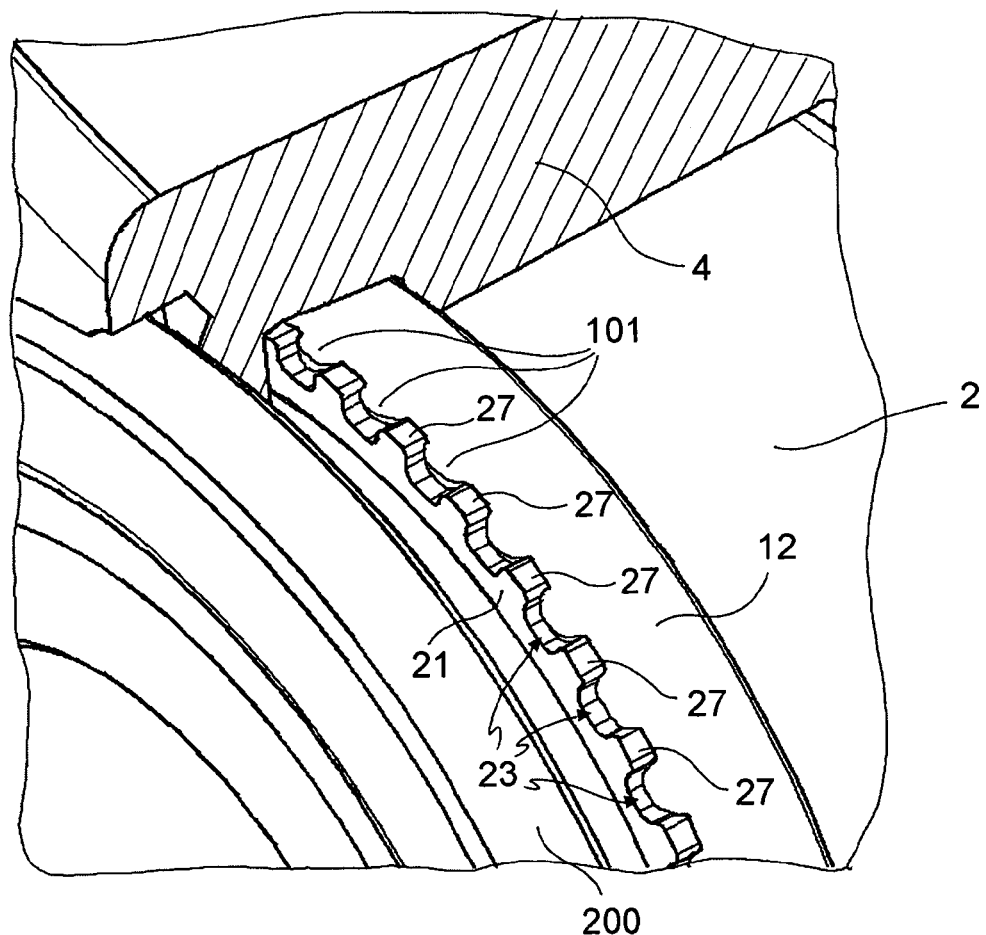
FIG. 12 shows a sectional axonometric view of a detail of the retracting device when the piston is subjected to a braking action of predefined high amount.

In accordance with an embodiment, said first chamber 18 is annular and so sized as to receive an elastic member 12 predefined portion 100 when this is urged by the movement of the piston coming out from the seat thereof of the caliper body (FIG. 11). In accordance with an embodiment, the elastic member urged by the movement of the piston exiting the seat thereof elastically springs out of shape and inserts a portion 100 thereof in the first chamber 18, remaining with the first radial surface thereof arranged preloaded or in forcible contact against the piston side surface integrally attached to this piston surface, thus elastically loading itself.

Such elastic stress loaded in the elastic member allows, when the braking action stops, the return of the piston of a predefined stroke adapted to cause the desired piston retraction as a function only of the piston movement relative to the seat thereof, also following reduced braking actions, such as, for example, in the case of modest braking actions of the vehicle, or decelerations which have in any case caused the pad wearing against the disc friction surfaces.

In accordance with an embodiment, a predefined plurality of second chambers 20, 23 is provided, having a number and radial d, axial S, and also circumferential d' or d" or d''' dimensions adapted to receive portions 101 of the elastic member 12 when the brake fluid reaches a predefined pressure which corresponds to a predefined and sensible elastic strain of the caliper 4 body.

In accordance with an embodiment, independently from the piston movement relative to the seat thereof, when the pressure of the brake fluid reaches a predefined value, it begins to sensibly strain an elastic member 12 portion 101 inside the second chamber 20 or 23. In accordance with an embodiment, the surface pad side 16 of the elastic member springs out of shape, thus entering the second chamber 20 and abutting against the abutment surface 19.

Figure 8:
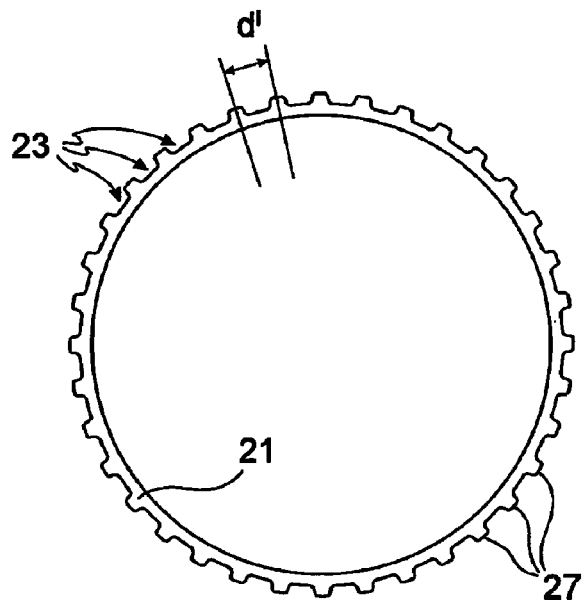
FIGS. 8 to 10 show a side view of three embodiments of a ring, which are adapted to define different retraction degrees of the piston into the seat thereof.
Figure 9:
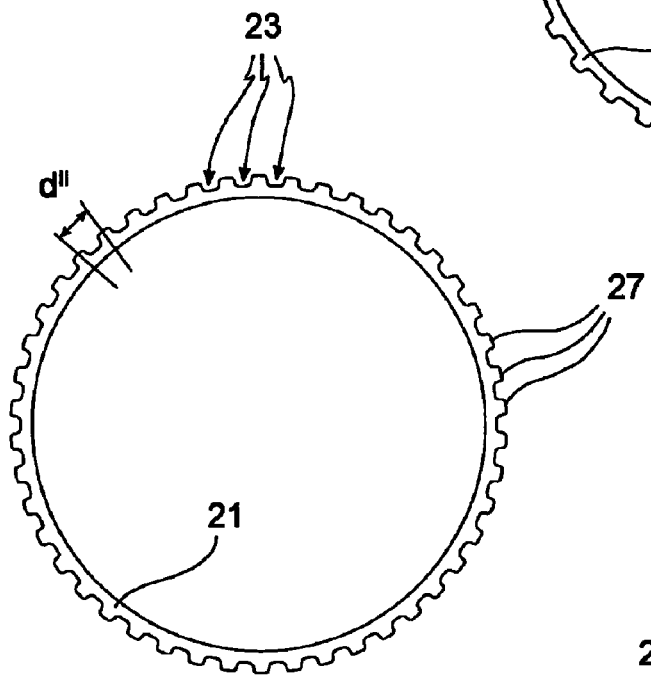
Figure 10:
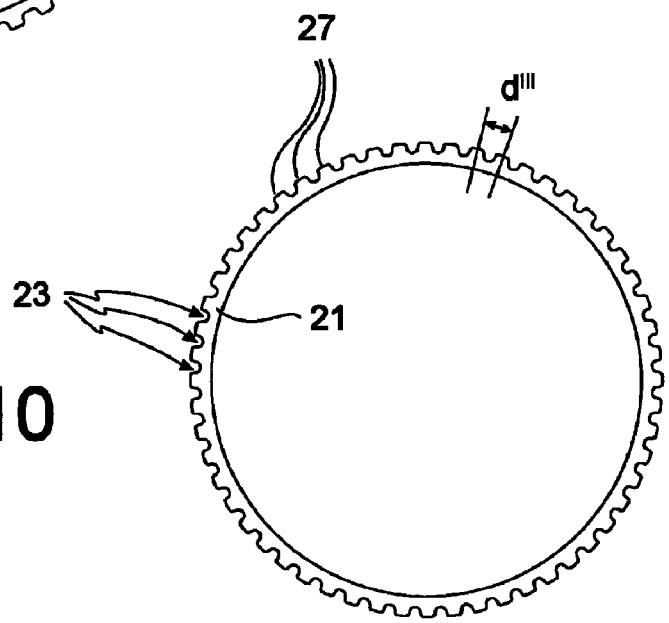

In accordance with an embodiment, said ring 21 is made of elastic material, for example, PTFE®. Advantageously, said ring is provided with a predefined number of bumps or teeth 27, for example, having predefined radial d, axial S, and tangential dimensions defining predefined recesses 23 of a preset tangential extension d', d", or d''' (FIGS. 8, 9, and 10) therebetween, which allow a sensible elastic strain of the ring when a predefined stress exerted thereon is reached. In accordance with an embodiment, when the braking action stops, the elastic member strained portion 101 causes an elastic return which drags the piston into the seat thereof in a further retraction stroke.

In accordance with an embodiment, said elastic member 12 is received in an annular seat 26 comprising a bottom 28 adapted to be in forcible or sealed contact with said elastic member. In accordance with an embodiment, said bottom comprises an inclined portion 29 so as to reduce the radial dimension of the annular seat at the side opposite the disc, and a cylindrical portion 30 adapted to define part of the second chamber 20 and, in accordance with an embodiment, to receive said ring 21.

In accordance with an embodiment, the caliper comprises a caliper body having a hub side extended portion adapted to face a disc side facing a vehicle hub, a side wheel extended portion adapted to face the disc side facing a vehicle wheel, and at least two end bridges adapted to connect the ends of said side hub and side wheel extended portions. Advantageously, the side hub and side wheel extended portions and the at least two end bridges are manufactured in a single piece.

An operative method of the piston retracting device is described herein below.

The first radial surface (13) of the elastic member (12) is arranged as to contact the piston (2) so that it is dragged by the movement of the piston exiting the seat thereof of the caliper body, thus elastically straining an elastic member (12) portion (100) in the first chamber (18), and pressing said elastic member against the abutment surface (19).

If a predefined pressure of the brake fluid is reached, a portion (101) far from the elastic member (12) piston inside the second chamber (20) elastically springs out of shape.

When the brake fluid action stops, the elastic member being press-contacted with the piston side surface elastically returns the piston by an amount proportional to the elastic member strain exerted in the first chamber (18).

Furthermore, if, during the braking action, the pressure exerted on the elastic member with a predefined value has been reached, which elastically strains the elastic member in the at least one second chamber having predefined dimensions, when the braking action stops, the piston is returned into the seat thereof of a further stroke thanks to the elastically strained portion in the at least one second chamber of the elastic member, and thanks to the fact that the latter exerts a leveraging action on the abutment surface. This further retraction stroke compensates for the approaching to the piston disc resulting from the recovery of the caliper body elastic strain.

Figure 13:
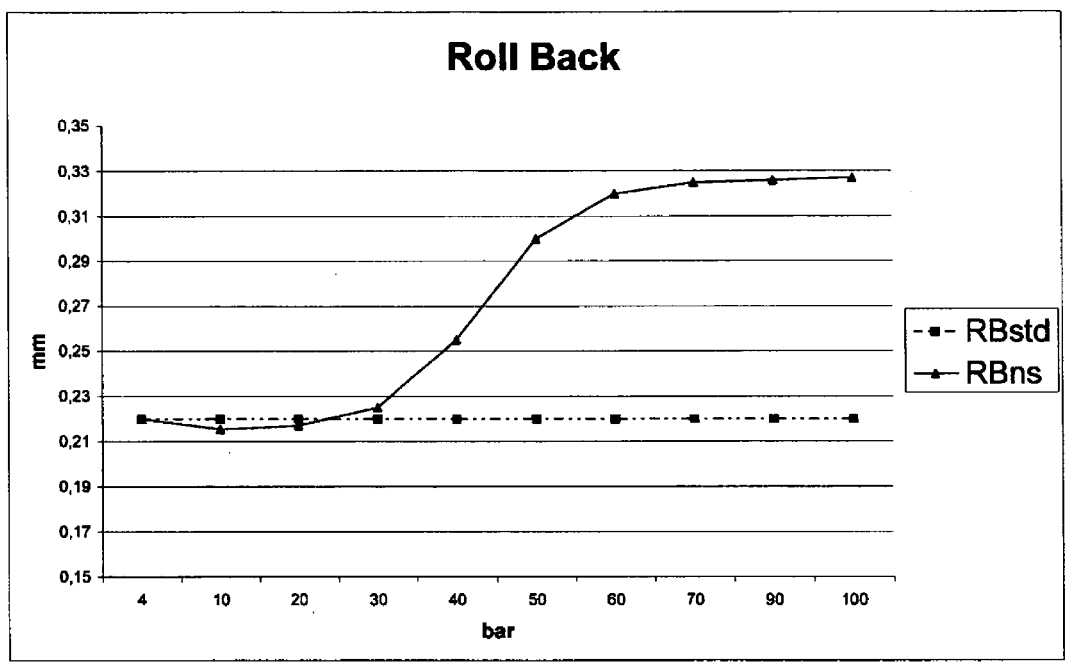
FIG. 13 illustrates a graph illustrating as a function of the pressure exerted by the brake fluid on a caliper piston and the retracting device thereof, comparing a prior art solution of the technique RBstd and the behaviour of a device according to the present invention.

As reported in FIG. 13, the Applicant has carried out several operational tests on the retracting device as described and illustrated, finding a reliable repeatability in the retraction measured on the pistons.

Figure 5:
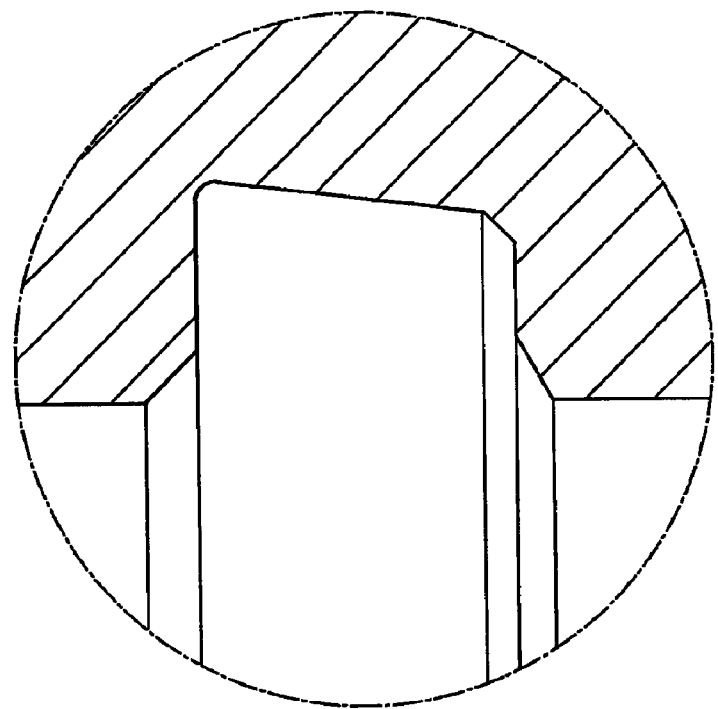
FIG. 5 illustrates a section of a detail of a groove for sealing member of a caliper according to the prior art.
Figure 6:
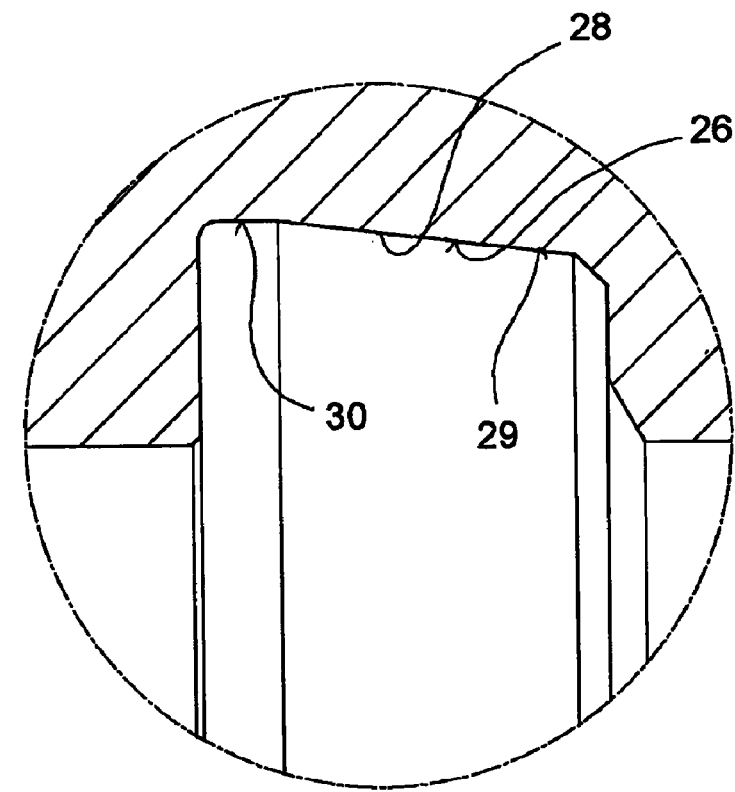
FIG. 6 shows a section of a detail of the annular seat adapted to receive the retracting device.
Figure 7:
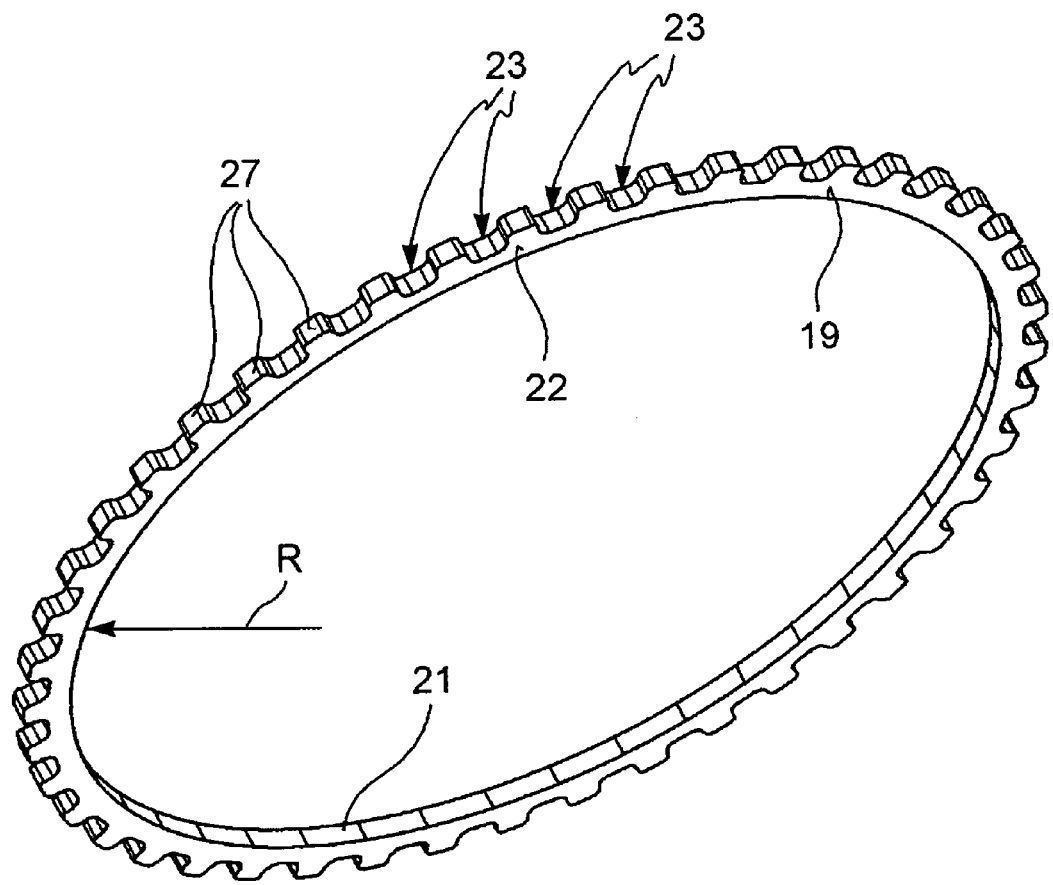
FIG. 7 illustrates an axonometric view of a toothed ring, which is part of the retracting device according to one of the embodiments.

Particularly, it is understood from FIG. 13 how, as compared to a retraction obtained with a sealing gasket housed in a groove obtained according to the prior art (FIG. 5), indicated with the curve RBstd upon varying the pressure of the brake fluid supplied to the caliper, the retraction (curve RBns) which is obtained with the described device upon reaching a pressure of the brake fluid supplied to the caliper of about 30-40 bars undergoes an increase that has resulted to perfectly compensate the caliper body elastic strain generated by the braking action at the corresponding brake fluid pressure.

Some exemplary methods for the adjustment of a piston retraction are described herein below.

By selecting a ring 21 with a predefined clearance D between the inner radial surface thereof and the piston side surface, it is possible to define the size of the first chamber 18 adapted to receive the elastic strain of the elastic member which is dragged by the relative movement of the piston exiting the seat thereof, and accordingly the amount of the return that the elastic member, via the first surface 13 thereof of forcible-contact between elastic member and piston, will impose to the piston, when the braking action stops, as the first piston retraction stroke independently from the fact that the braking action exceeds a predefined minimum threshold.

By selecting a ring 21 having a preset number and dimension of the recesses 23 which are radially outer and axially-opened towards the elastic member, for example, the recesses defined by the e.g. radial bumps or teeth 27, of the ring, it is possible to define:

the brake fluid pressure minimum threshold which determines a sensible strain of the elastic member in the second chambers 20, which minimum threshold will be selected so as to be proportional to the threshold of sensible elastic strain of the caliper body which is intended to compensate;

the retraction amount which the elastic member, when the braking action stops, will impose to the piston, via the first surface 13 of forcible contact between elastic member and piston thereof, by levering on the ring abutment surface 19, determining a second or further retraction stroke of the piston independent from the piston relative movement relative to the seat thereof (FIG. 11).

In view of what has been set forth above, it is possible to understand how it is particularly easy to adjust a brake caliper so as it has a desired roll-back also in operative conditions which are very different from one another. It will be even possible to differently adjust also different devices which are present in the same caliper or in the calipers of a same motor vehicle, in order to provide a more efficient behaviour of the whole braking system.

To the above-described preferred implementation solution of the device, those of ordinary skill in the art, to the aim of meeting contingent and specific needs, will be able to make a number of modifications, adaptations, and replacements, of elements with functionally equivalent other ones, without anyhow departing from the scope of the following claims.

The invention claimed is:

1. A piston retracting device for a brake caliper, said brake caliper comprising a caliper body located astride a brake disc having a rotational axis and opposite friction surfaces and pads slidably supported by said caliper body for axial movement relative to the brake disc to engage said opposite friction surfaces, respectively, said caliper body having a piston seat and a piston having a side surface slidably disposed within said piston seat for urging at least one of said pads against said brake disc friction surfaces when brake fluid in said seat is pressurized, wherein said piston retracting device comprises:

at least one elastic member arranged with a first radial surface thereof bearing against said piston side surface, and with a second radial surface thereof bearing against the caliper body;

said elastic member comprising a third axial surface facing away from said pads and adapted to be affected by the brake fluid;

said elastic member comprising a fourth axial surface facing the pads;

said fourth surface facing an abutment surface on the caliper body adapted to support said elastic member when urged by the pressurized fluid, a portion of said fourth surface facing at least one second chamber arranged radially farther from said piston side surface than said abutment surface, another portion of said fourth surface facing a first chamber arranged in the proximity of the piston side surface, said first chamber being opened towards said piston side surface; and said abutment surface being radially farther from the piston side surface than said first chamber; and further comprising a ring housed in an annular seat and axially sandwiched between said at least one elastic member and the caliper body at the side opposite the elastic member brake fluid, said ring having an inner radial dimension greater than that of said piston so as to leave a clearance between said ring and said piston side surface so as to create said first chamber, said ring comprising a side surface facing said at least one elastic member and providing said abutment surface;

said ring having, in an outer periphery thereof, at least one radial recess axially opened at least at the side facing said at least one elastic member so as to create said at least one second chamber.

2. The piston retracting device according to claim 1, wherein said first chamber is annular and so sized as to receive an elastic member predefined portion which is urged by movement of the piston coming out from its seat, and which, when the braking action stops, returns the piston by a predefined stroke.

3. The piston retracting device according to claim 1, wherein a predefined plurality of second chambers is provided, of a number and dimension adapted to receive portions of the elastic member as the brake fluid reaches a predefined pressure corresponding to a predefined elastic strain of the caliper body.

4. The piston retracting device according to claim 1, wherein said ring is made of elastic material and is provided with a predefined number of bumps or teeth which allow a detectable elastic strain when a predefined stress exerted thereon is reached which, when the braking action stops, determines an elastic return on the elastic member which drags the piston to the seat thereof in a retraction stroke.

5. The piston retracting device according to claim 1, wherein said elastic member is received in an annular seat, said seat comprising a bottom adapted to be in forcible contact with said elastic member, said bottom comprising an inclined portion so as to reduce the annular seat radial dimension at the side opposite the disc, and a cylindrical portion adapted to define part of the second chamber.

6. A caliper for a disc brake, said brake caliper comprising a caliper body located astride a brake disc having a rotational axis and opposite friction surfaces, pads slidably supported by said caliper body for axial movement relative to the brake disc to engage said opposite friction surfaces, respectively, said caliper body having a piston seat and a piston having a side surface slidably disposed within said piston seat for urging at least one of said pads against said brake disc friction surfaces when brake fluid in said seat is pressurized, wherein said caliper comprises an annular seat adapted to receive a piston retracting device, said piston retracting device comprising:

at least one elastic member arranged with a first radial surface thereof bearing against said piston side surface, and with a second radial surface thereof bearing against the caliper body;

said elastic member comprising a third axial surface facing away from said pads and adapted to be affected by the brake fluid;

said elastic member comprising a fourth axial surface facing the pads;

said fourth surface facing an abutment surface on the caliper body adapted to support said elastic member when urged by the pressurized fluid, a portion of said fourth surface facing at least one second chamber arranged radially farther from said piston side surface than said abutment surface, another portion of said fourth surface facing a first chamber arranged in the proximity of the piston side surface, said first chamber being opened towards said piston side surface; and said abutment surface being radially farther from the piston side surface than said first chamber; and further comprising a ring housed in an annular seat and axially sandwiched between said at least one elastic member and the caliper body at the side opposite the elastic member brake fluid, said ring having an inner radial dimension greater than that of said piston so as to leave a clearance between said ring and said piston side surface so as to create said first chamber, said ring comprising a side surface facing said at least one elastic member and providing said abutment surface;

said ring having, in an outer periphery thereof, at least one radial recess axially opened at least at the side facing said at least one elastic member so as to create said at least one second chamber.

7. The caliper according to claim 6, wherein said caliper comprises a hub side portion adapted to face a first side of said disc, a wheel side portion adapted to face a second side of said disc, and at least two end bridges connecting said hub side and said wheel side portions, wherein the hub side and wheel side portions, and the at least two end bridges, are manufactured in a single piece.

8. A braking system comprising a caliper as described in claim 6.

* * * * *